United States Patent
Takahashi

(10) Patent No.: US 12,401,041 B2
(45) Date of Patent: Aug. 26, 2025

(54) CONDUCTIVE MATERIAL DISPERSION LIQUID, SLURRY FOR SECONDARY BATTERY POSITIVE ELECTRODE, POSITIVE ELECTRODE FOR SECONDARY BATTERY, AND SECONDARY BATTERY

(71) Applicant: ZEON CORPORATION, Tokyo (JP)

(72) Inventor: Naoki Takahashi, Tokyo (JP)

(73) Assignee: ZEON CORPORATION, Tokyo (JP)

(*) Notice: Subject to any disclaimer, the term of this patent is extended or adjusted under 35 U.S.C. 154(b) by 527 days.

(21) Appl. No.: 17/906,263

(22) PCT Filed: Mar. 16, 2021

(86) PCT No.: PCT/JP2021/010667
§ 371 (c)(1),
(2) Date: Sep. 14, 2022

(87) PCT Pub. No.: WO2021/200126
PCT Pub. Date: Oct. 7, 2021

(65) Prior Publication Data
US 2023/0129636 A1 Apr. 27, 2023

(30) Foreign Application Priority Data
Mar. 30, 2020 (JP) .............................. 2020-061327

(51) Int. Cl.
*H01M 4/62* (2006.01)
*H01M 10/0525* (2010.01)
*H01M 4/02* (2006.01)

(52) U.S. Cl.
CPC ....... *H01M 4/625* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 10,741,829 B2 | 8/2020 | Ahn et al. | |
| 11,038,175 B2 | 6/2021 | Ahn et al. | |
| 2017/0352915 A1 | 12/2017 | Katagiri et al. | |
| 2018/0175370 A1* | 6/2018 | Kim | H01M 4/1391 |
| 2018/0198129 A1* | 7/2018 | Kim | H01M 4/139 |
| 2018/0226650 A1 | 8/2018 | Yoo et al. | |
| 2018/0233734 A1 | 8/2018 | Ahn et al. | |
| 2019/0044150 A1 | 2/2019 | Kim et al. | |
| 2019/0276613 A1 | 9/2019 | Takeyama et al. | |
| 2021/0005894 A1 | 1/2021 | Murase et al. | |

FOREIGN PATENT DOCUMENTS

| | | |
|---|---|---|
| CN | 105814718 A | 7/2016 |
| CN | 107949940 A | 4/2018 |
| CN | 108140841 A | 6/2018 |
| CN | 108878743 A | 11/2018 |
| EP | 3331072 A1 | 6/2018 |
| EP | 3348582 A1 | 7/2018 |
| JP | 2018522803 A | 8/2018 |
| JP | 2018530113 A | 10/2018 |
| KR | 1020180107759 A | 10/2018 |
| WO | 2016103730 A1 | 6/2016 |
| WO | 2019181869 A1 | 9/2019 |
| WO | 2023090403 A1 | 5/2023 |
| WO | 2023145612 A1 | 8/2023 |

OTHER PUBLICATIONS

Sep. 29, 2022, International Preliminary Report on Patentability issued in the International Patent Application No. PCT/JP2021/010667.
A. Bottino et al., Solubility Parameters of Poly(vinylidene fluoride), Journal of Polymer Science: Part B: Polymer Physics, 1988, pp. 785-794, vol. 26.
Guangyong Liu et al., A new way to determine the three-dimensional solubility parameters of hydrogenated nitrile rubber and the predictive power, Polymer Testing, 2013, pp. 1128-1134, vol. 32.
Jan Badorrek et al., Tuning Intermolecular Interaction Between Lignin and Carbon Nanotubes in Fiber Composites—A Combined Experimental and Ab-Initio Modeling Study, J. Renew. Mater., Apr. 2018, pp. 325-335, vol. 6, No. 3.
Jun. 8, 2021, International Search Report issued in the International Patent Application No. PCT/JP2021/010667.
Pirika.com, Retrieved on May 16, 2022, from URL: https://pirika.com/HSP/JP/Examples/Docs/Material.html.
Database WPI Week 2023047 Thomson Scientific, London, GB; AN 2023-56534P, XP002812072, 2023.
Database WPI Week 2023068 Thomson Scientific, London, GB; AN 2023-813404, XP002812071, 2023.
Sep. 10, 2024, the Extended European Search Report issued by the European Patent Office in the corresponding European Patent Application No. 21781382.3.

\* cited by examiner

*Primary Examiner* — Carlos Barcena
(74) *Attorney, Agent, or Firm* — KENJA IP LAW PC

(57) ABSTRACT

Provided is a conductive material dispersion liquid that can reduce internal resistance of a secondary battery while also ensuring good high-temperature storage characteristics of the secondary battery. The conductive material dispersion liquid contains a carbon material, a dispersant, and a dispersion medium. An HSP distance ($R_a$) of Hansen solubility parameters ($HSP_c$) of the carbon material and Hansen solubility parameters ($HSP_d$) of the dispersant is 10.0 $MPa^{1/2}$ or less.

8 Claims, No Drawings

CONDUCTIVE MATERIAL DISPERSION LIQUID, SLURRY FOR SECONDARY BATTERY POSITIVE ELECTRODE, POSITIVE ELECTRODE FOR SECONDARY BATTERY, AND SECONDARY BATTERY

TECHNICAL FIELD

The present disclosure relates to a conductive material dispersion liquid, a slurry for a secondary battery positive electrode, a positive electrode for a secondary battery, and a secondary battery.

BACKGROUND

Secondary batteries such as lithium ion secondary batteries have characteristics such as compact size, light weight, high energy-density, and the ability to be repeatedly charged and discharged, and are used in a wide range of applications. An electrode for a lithium ion secondary battery, for example, generally includes a current collector and an electrode mixed material layer formed on the current collector. An electrode mixed material layer such as a positive electrode mixed material layer, for example, is typically formed by applying, onto a current collector, a slurry for a positive electrode that contains a positive electrode active material and also contains a conductive material for improving electrical conductivity, a binder for binding these components, and so forth in a dispersion medium, and then drying the slurry for a positive electrode.

Attempts have been made to improve slurries for electrodes such as slurries for positive electrodes with the aim of improving the performance of electrochemical devices. For example, carbon materials used as conductive materials have a high tendency to aggregate. For this reason, a technique of premixing a carbon material and a dispersant in a dispersion medium to prepare a conductive material dispersion liquid and then combining the obtained conductive material dispersion liquid with an electrode active material, etc., to produce a slurry for an electrode has been proposed with the aim of sufficiently dispersing the carbon material and causing a secondary battery to display excellent battery characteristics (for example, refer to Patent Literature (PTL) 1 to 5).

CITATION LIST

Patent Literature

PTL 1: WO2016/103730A1
PTL 2: WO2019/181869A1
PTL 3: JP2018-522803A
PTL 4: JP2015-13302A
PTL 5: JP2018-45820A

SUMMARY

Technical Problem

However, there is demand for further improving battery characteristics of a secondary battery in the conventional technique described above. Specifically, there is demand for further reducing internal resistance of a secondary battery and sufficiently inhibiting gas release during high-temperature storage of a secondary battery (i.e., improving high-temperature storage characteristics).

Accordingly, one object of the present disclosure is to provide a conductive material dispersion liquid, a slurry for a secondary battery positive electrode, and a positive electrode for a secondary battery that can reduce internal resistance of a secondary battery while also ensuring good high-temperature storage characteristics of the secondary battery.

Another object of the present disclosure is to provide a secondary battery having reduced internal resistance and excellent high-temperature storage characteristics.

Solution to Problem

The inventor conducted diligent investigation with the aim of solving the problem set forth above. The inventor discovered that by producing an electrode using a conductive material dispersion liquid that contains a carbon material and a dispersant in a dispersion medium and for which an HSP distance ($R_d$) of Hansen solubility parameters ($HSP_c$) of the carbon material and Hansen solubility parameters ($HSP_d$) of the dispersant is not more than a specific value, it is possible to reduce internal resistance of a secondary battery while also improving high-temperature storage characteristics of the secondary battery, and, in this manner, completed the present disclosure.

Specifically, the present disclosure aims to advantageously solve the problem set forth above, and a presently disclosed conductive material dispersion liquid comprises a carbon material, a dispersant, and a dispersion medium, wherein an HSP distance ($R_d$) of Hansen solubility parameters ($HSP_c$) of the carbon material and Hansen solubility parameters ($HSP_d$) of the dispersant is 10.0 MPa$^{1/2}$ or less. By producing an electrode using a conductive material dispersion liquid that contains, in a dispersion medium, a carbon material and a dispersant for which the HSP distance ($R_d$) is not more than the value set forth above in this manner, it is possible to reduce internal resistance and ensure good high-temperature storage characteristics of a secondary battery that includes the electrode.

Note that the "Hansen solubility parameters ($HSP_c$) of the carbon material" referred to in the present disclosure include a polarity term $\delta_{p1}$, a dispersion term $\delta_{d1}$, and a hydrogen bonding term $\delta_{h1}$, and the "Hansen solubility parameters ($HSP_d$) of the dispersant" referred to in the present disclosure include a polarity term $\delta_{p2}$, a dispersion term $\delta_{d2}$, and a hydrogen bonding term $\delta_{h2}$.

Also note that "$\delta_{p1}$", "$\delta_{d1}$", "$\delta_{h1}$", "$\delta_{p2}$", "$\delta_{d2}$", and "$\delta_{h2}$" referred to in the present disclosure can be determined by a method described in the EXAMPLES section.

Moreover, the "HSP distance ($R_d$)" referred to in the present disclosure can be calculated using the following formula (1).

$$\text{HSP distance } (R_d) = \{(\delta_{p1}-\delta_{p2})^2 + 4\times(\delta_{d1}-\delta_{d2})^2 + (\delta_{h1}-\delta_{h2})^2\}^{1/2} \quad (1)$$

In the presently disclosed conductive material dispersion liquid, a hydrogen bonding term $\delta_{h1}$ among the Hansen solubility parameters ($HSP_c$) of the carbon material is preferably 12.0 MPa$^{1/2}$ or less. When the hydrogen bonding term $\delta_{h1}$ is not more than the value set forth above, viscosity stability of the conductive material dispersion liquid can be increased, and internal resistance of a secondary battery can be further reduced while also further improving high-temperature storage characteristics of the secondary battery.

In the presently disclosed conductive material dispersion liquid, the carbon material preferably includes a fibrous carbon material. By using a fibrous carbon material as the carbon material, it is possible to provide a secondary battery with high capacity.

Note that the "fibrous carbon material" referred to in the present disclosure is taken to be a carbon material having an aspect ratio (major axis/minor axis) of 5 or more. Also note that the aspect ratio of the fibrous carbon material is preferably more than 10. The "aspect ratio" can be determined by observing the fibrous carbon material using a scanning electron microscope (SEM), measuring the largest axis (major axis) and the fiber diameter (minor axis) in a direction orthogonally intersecting the largest axis for arbitrary fibers among the fibrous carbon material, and calculating a ratio of the major axis and the minor axis (major axis/minor axis).

Moreover, the present disclosure aims to advantageously solve the problem set forth above, and a presently disclosed slurry for a secondary battery positive electrode comprises: any one of the conductive material dispersion liquids set forth above; and a positive electrode active material. By producing a positive electrode using a slurry for a positive electrode that contains a positive electrode active material and any one of the conductive material dispersion liquids set forth above, it is possible to reduce internal resistance and ensure good high-temperature storage characteristics of a secondary battery that includes the positive electrode.

The presently disclosed slurry for a secondary battery positive electrode preferably further comprises a binder. When the slurry for a positive electrode further contains a binder, sedimentation of the positive electrode active material can be inhibited, and a positive electrode mixed material layer formed using the slurry for a positive electrode can be caused to closely adhere well to a current collector.

In the presently disclosed slurry for a secondary battery positive electrode, an HSP distance ($R_b$) of the Hansen solubility parameters ($HSP_c$) of the carbon material and Hansen solubility parameters ($HSP_b$) of the binder is preferably larger than the HSP distance ($R_d$). When the HSP distance ($R_b$) is larger than the HSP distance ($R_d$), internal resistance of a secondary battery can be further reduced.

Note that the "Hansen solubility parameters ($HSP_b$) of the binder" referred to in the present disclosure include a polarity term $\delta_{p3}$, a dispersion term $\delta_{d3}$, and a hydrogen bonding term $\delta_{h3}$.

Also note that "$\delta_{p3}$", "$\delta_{d3}$", and "$\delta_{h3}$" referred to in the present disclosure can be determined by a method described in the EXAMPLES section.

Moreover, the "HSP distance ($R_b$)" referred to in the present disclosure can be calculated using the following formula (2).

$$\text{HSP distance } (R_b) = \{(\delta_{p1}-\delta_{p3})^2 + 4\times(\delta_{d1}-\delta_{d3})^2 + (\delta_{h1}-\delta_{h3})^2\}^{1/2} \quad (2)$$

Furthermore, the present disclosure aims to advantageously solve the problem set forth above, and a presently disclosed positive electrode for a secondary battery comprises a positive electrode mixed material layer formed using any one of the slurries for a secondary battery positive electrode set forth above. Through a positive electrode including a positive electrode mixed material layer that is formed using any one of the slurries for a secondary battery positive electrode set forth above, it is possible to reduce internal resistance and ensure good high-temperature storage characteristics of a secondary battery.

Also, the present disclosure aims to advantageously solve the problem set forth above, and a presently disclosed secondary battery comprises the positive electrode for a secondary battery set forth above. A secondary battery that includes the positive electrode for a secondary battery set forth above has reduced internal resistance and excellent high-temperature storage characteristics.

Advantageous Effect

According to the present disclosure, it is possible to provide a conductive material dispersion liquid, a slurry for a secondary battery positive electrode, and a positive electrode for a secondary battery that can reduce internal resistance of a secondary battery while also ensuring good high-temperature storage characteristics of the secondary battery.

Moreover, according to the present disclosure, it is possible to provide a secondary battery having reduced internal resistance and excellent high-temperature storage characteristics.

DETAILED DESCRIPTION

The following provides a detailed description of embodiments of the present disclosure.

The presently disclosed conductive material dispersion liquid may be used as a material in production of a slurry for a secondary battery electrode, and preferably of a slurry for a secondary battery positive electrode. Moreover, the presently disclosed slurry for a secondary battery positive electrode is produced using the presently disclosed conductive material dispersion liquid. Also, a feature of the presently disclosed positive electrode for a secondary battery is that it includes a positive electrode mixed material layer formed using the presently disclosed slurry for a secondary battery positive electrode. Furthermore, a feature of the presently disclosed secondary battery is that it includes the presently disclosed positive electrode for a secondary battery.

(Conductive Material Dispersion Liquid)

The presently disclosed conductive material dispersion liquid contains a carbon material, a dispersant, and a dispersion medium, and may optionally contain other components. Note that, in general, the conductive material dispersion liquid does not contain an electrode active material (positive electrode active material or negative electrode active material).

A feature of the presently disclosed conductive material dispersion liquid is that an HSP distance ($R_d$) of Hansen solubility parameters ($HSP_c$) of the carbon material and Hansen solubility parameters ($HSP_d$) of the dispersant is 10.0 MPa$^{1/2}$ or less. By using a slurry for an electrode that contains the presently disclosed conductive material dispersion liquid to form an electrode mixed material layer of an electrode, it is possible to reduce internal resistance of a secondary battery that includes the electrode while also improving high-temperature storage characteristics of the secondary battery.

Although it is not clear why the above-described effects are obtained through the presently disclosed conductive material dispersion liquid in which the HSP distance ($R_d$) is 10 MPa$^{1/2}$ or less, the reason for this is presumed to be as follows.

Specifically, as a result of the HSP distance ($R_d$) being 10 MPa$^{1/2}$ or less, the carbon material and the dispersant have extremely high affinity, and thus the dispersant can cover the surface of the carbon material well in a dispersion medium and cause sufficient dispersion of the carbon material. Consequently, the carbon material serving as a conductive material can be uniformly distributed throughout an electrode mixed material layer, good electrical conduction paths can be formed, and internal resistance of a secondary battery can be reduced. In addition, good coverage of the surface of the carbon material by the dispersant as described above can inhibit the decomposition of electrolyte solution at the surface of the carbon material inside a secondary battery. Consequently, it is possible to sufficiently inhibit gas release during high-temperature storage of the secondary battery.

<Carbon Material>

The carbon material is not specifically limited so long as it is a material that functions as a conductive material that can ensure electrical contact among an electrode active material in an electrode mixed material layer. Examples of such carbon materials include carbon black (for example, acetylene black, Ketjenblack® (Ketjenblack is a registered trademark in Japan, other countries, or both), and furnace black); graphite; carbon flake; and fibrous carbon materials such as carbon nanofiber, carbon nanotubes (hereinafter, also abbreviated as "CNTs"), and vapor-grown carbon fiber. One of these carbon materials may be used individually, or two or more of these carbon materials may be used in combination. Of these carbon materials, fibrous carbon materials are preferable from a viewpoint of forming good electrical conduction paths in an electrode mixed material layer and increasing secondary battery capacity even through a small amount thereof, with carbon nanofiber and carbon nanotubes being more preferable, and carbon nanotubes being even more preferable.

The carbon material described above can be produced by a known method. For example, CNTs can be produced by a method such as the super growth method (refer to WO2006/011655A1).

The carbon material may be subjected to surface treatment. This surface treatment can be performed by bringing a treatment solution such as a solution of an acid, a solution of an alkali, and/or aqueous ozone or a gas containing ozone into contact with the carbon material or may be performed through plasma treatment. Although no specific limitations are placed on the method by which the treatment solution is brought into contact with the carbon material, it is preferable that the carbon material is immersed in the treatment solution.

<<Hansen Solubility Parameters ($HSP_c$)>>

As previously described, $HSP_c$ includes three parameters: a polarity term $\delta_{p1}$; a dispersion term $\delta_{d1}$; and a hydrogen bonding term $\delta_{h1}$.

The polarity term $\delta_{p1}$ is not specifically limited but is preferably 3.0 $MPa^{1/2}$ or more, and more preferably 5.0 $MPa^{1/2}$ or more, and is preferably 13.0 $MPa^{1/2}$ or less, and more preferably 11.0 $MPa^{1/2}$ or less.

Moreover, the dispersion term $\delta_{d1}$ is preferably 13.0 $MPa^{1/2}$ or more, and more preferably 16.0 $MPa^{1/2}$ or more, and is preferably 22.0 $MPa^{1/2}$ or less, and more preferably 20.0 $MPa^{1/2}$ or less.

Furthermore, the hydrogen bonding term $\delta_{h1}$ is preferably 12.0 $MPa^{1/2}$ or less, more preferably 10.0 $MPa^{1/2}$ or less, even more preferably 7.0 $MPa^{1/2}$ or less, and particularly preferably 5.0 $MPa^{1/2}$ or less. When the hydrogen bonding term $\delta_{h1}$ is 12.0 $MPa^{1/2}$ or less, decomposition of electrolyte solution at the surface of the carbon material can be inhibited and high-temperature storage characteristics can be further improved, which is presumed to be due to the carbon material and the dispersant having higher affinity and there being fewer functional groups (which contribute to increasing the hydrogen bonding term $\delta_{h1}$). In addition, there is not excessive interaction among the carbon material, and viscosity stability of the conductive material dispersion liquid can be sufficiently ensured.

The lower limit for the hydrogen bonding term $\delta_{h1}$ of the carbon material is not specifically limited and can be set as 1.5 $MPa^{1/2}$ or more, for example.

Note that the Hansen solubility parameters ($HSP_c$) of the carbon material are presumed to be influenced by the amount of defects and the amount of functional groups at the surface of the carbon material and can be adjusted by, for example, altering the type of carbon material, the production conditions of the carbon material, the surface treatment conditions of the carbon material, and so forth.

Although no specific limitations are placed on the content of the carbon material in the conductive material dispersion liquid, when the mass of the entire conductive material dispersion liquid is taken to be 100 mass %, the content of the carbon material is preferably 1.0 mass % or more, more preferably 2.0 mass % or more, and even more preferably 3.0 mass % or more, and is preferably 30.0 mass % or less, more preferably 25.0 mass % or less, and even more preferably 20.0 mass % or less. When the content of the carbon material in the conductive material dispersion liquid is within any of the ranges set forth above, the carbon material can be dispersed well in the conductive material dispersion liquid, and viscosity stability of the conductive material dispersion liquid can be ensured. Moreover, internal resistance of a secondary battery can be further reduced while also further improving high-temperature storage characteristics of the secondary battery.

<Dispersant>

The dispersant is not specifically limited so long as it is a polymer that can disperse the carbon material described above in the dispersion medium. A polymer that includes at least a nitrile group-containing monomer unit and an alkylene structural unit and that optionally includes other repeating units is preferable as such a polymer.

The phrase "includes a monomer unit" as used in the present disclosure means that "a repeating unit derived from that monomer is included in a polymer obtained using the monomer".

Moreover, the phrase "includes an alkylene structural unit" as used in the present disclosure means that "a repeating unit composed of only an alkylene structure represented by a general formula —$C_nH_{2n}$— (n is an integer of 2 or more) is included in a polymer".

Furthermore, the proportional contents of monomer units and structural units in a polymer referred to in the present disclosure can be measured by a nuclear magnetic resonance (NMR) method such as $^1$H-NMR or $^{13}$C-NMR.

<<Nitrile Group-Containing Monomer Unit>>

Examples of nitrile group-containing monomers that can form a nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. One nitrile group-containing monomer may be used individually, or two or more nitrile group-containing monomers may be used in combination in a freely selected ratio. Of these nitrile group-containing monomers, acrylonitrile is preferable.

The proportional content of nitrile group-containing monomer units in the dispersant when all repeating units in the dispersant are taken to be 100 mass % is preferably 3 mass % or more, more preferably 5 mass % or more, and even more preferably 7 mass % or more, and is preferably 50 mass % or less, more preferably 40 mass % or less, even more preferably 30 mass % or less, and particularly preferably 28 mass % or less. When the proportional content of nitrile group-containing monomer units in the dispersant is within any of the ranges set forth above, solubility of the dispersant in the dispersion medium (for example, N-methyl-2-pyrrolidone) is sufficiently ensured, and an obtained electrode mixed material layer can be caused to closely adhere well to a current collector. Consequently, the carbon material can be dispersed well in the conductive material dispersion liquid, and viscosity stability of the conductive material dispersion liquid can be ensured. Moreover, internal resistance of a secondary battery can be further reduced while also further improving high-temperature storage characteristics of the secondary battery.

<<Alkylene Structural Unit>>

The alkylene structural unit may be linear or branched, but is preferably linear (i.e., is preferably a linear alkylene structural unit) from a viewpoint of further reducing internal resistance of a secondary battery while also further improving high-temperature storage characteristics of the secondary battery.

Examples of methods by which the alkylene structural unit may be introduced into the dispersant, which is a polymer, include the following methods (1) and (2), but are not specifically limited thereto.

(1) A method in which a polymer is produced from a monomer composition containing a conjugated diene monomer and then the polymer is hydrogenated so as to convert a conjugated diene monomer unit to an alkylene structural unit (2) A method in which a polymer is produced from a monomer composition containing a 1-olefin monomer Of these methods, method (1) is preferable in terms of ease of production of the dispersant.

The conjugated diene monomer may be a conjugated diene compound having a carbon number of 4 or more such as 1,3-butadiene, isoprene, 2,3-dimethyl-1,3-butadiene, or 1,3-pentadiene, for example. Of these conjugated diene compounds, 1,3-butadiene is preferable. In other words, the alkylene structural unit is preferably a structural unit obtained through hydrogenation of a conjugated diene monomer unit (i.e., is preferably a hydrogenated conjugated diene unit), and is more preferably a structural unit obtained through hydrogenation of a 1,3-butadiene monomer unit (i.e., is more preferably a hydrogenated 1,3-butadiene unit).

The 1-olefin monomer may be ethylene, propylene, 1-butene, or the like, for example.

One of these conjugated diene monomers or 1-olefin monomers may be used individually, or two or more of these conjugated diene monomers or 1-olefin monomers may be used in combination in a freely selected ratio.

The following two types of units may be present among hydrogenated 1,3-butadiene units depending on the bonding format during formation of 1,3-butadiene units prior to hydrogenation.

(A) A structural unit obtained through hydrogenation of a 1,3-butadiene unit formed through 1,4-bonding of 1,3-butadiene ($-CH_2-CH_2-CH_2-CH_2-$; hereinafter, referred to as a "1,4-bonded hydrogenated butadiene unit")

(B) A structural unit obtained through hydrogenation of a 1,3-butadiene unit formed through 1,2-bonding of 1,3-butadiene ($-CH_2-CH(C_2H_5)-$; hereinafter, referred to as a "1,2-bonded hydrogenated butadiene unit")

In a case in which the dispersant includes a hydrogenated 1,3-butadiene unit, 1,2-bonded hydrogenated butadiene units are preferably 15 mass % or less, and more preferably 10 mass % or less when all hydrogenated 1,3-butadiene units (i.e., the total of 1,4-bonded hydrogenated butadiene units and 1,2-bonded hydrogenated butadiene units) in the dispersant are taken to be 100 mass %. When the proportion constituted by 1,2-bonded hydrogenated butadiene units among all hydrogenated 1,3-butadiene units is 15 mass % or less, the number of side chain ethyl groups ($-C_2H_5$) in the dispersant can be reduced, and the dispersant can be dissolved well in the dispersion medium (for example, N-methyl-2-pyrrolidone). Consequently, the carbon material can be dispersed well in the conductive material dispersion liquid, and viscosity stability of the conductive material dispersion liquid can be ensured. Moreover, internal resistance of a secondary battery can be further reduced while also further improving high-temperature storage characteristics of the secondary battery.

The lower limit for the proportion constituted by 1,2-bonded hydrogenated butadiene units among all hydrogenated 1,3-butadiene units is not specifically limited, but is 0 mass % or more, and can be set as 4.0 mass % or more, for example.

Moreover, the proportion constituted by 1,2-bonded hydrogenated butadiene units among all hydrogenated 1,3-butadiene units can be adjusted by altering the production method (type of polymerization initiator, etc.) of the dispersant.

The proportional content of alkylene structural units in the dispersant when all repeating units in the dispersant are taken to be 100 mass % is preferably 20 mass % or more, and more preferably 25 mass % or more, and is preferably 80 mass % or less, and more preferably 75 mass % or less. When the proportional content of alkylene structural units in the dispersant is within any of the ranges set forth above, the carbon material can be dispersed well in the conductive material dispersion liquid, and viscosity stability of the conductive material dispersion liquid can be ensured, which is presumed to be due to increased affinity of the carbon material and the dispersant. Moreover, the dispersant can cover the surface of the carbon material well, and can thereby inhibit decomposition of electrolyte solution at the surface of the carbon material and further improve high-temperature storage characteristics.

<<Other Repeating Units>>

Examples of other repeating units that can be included in the dispersant include, but are not specifically limited to, an aromatic vinyl monomer unit, an acidic group-containing monomer unit, and a (meth)acrylic acid ester monomer unit. The dispersant may include one type of other repeating unit or may include two or more types of other repeating units.

Note that in the present disclosure, "(meth)acryl" is used to indicate "acryl" and/or "methacryl".

[Aromatic Vinyl Monomer Unit]

Examples of aromatic vinyl monomers that can form an aromatic vinyl monomer unit include styrene, α-methylstyrene, p-t-butylstyrene, butoxystyrene, vinyltoluene, chlorostyrene, and vinylnaphthalene. One aromatic vinyl monomer may be used individually, or two or more aromatic vinyl monomers may be used in combination in a freely selected ratio. Of these aromatic vinyl monomers, styrene is preferable.

In a case in which the dispersant includes an aromatic vinyl monomer unit, the proportional content of aromatic vinyl monomer units in the dispersant is, from a viewpoint of further reducing internal resistance of a secondary battery while also further improving high-temperature storage characteristics of the secondary battery, preferably 10 mass % or more, and preferably 20 mass % or more when all repeating units in the dispersant are taken to be 100 mass %, and is more preferably 40 mass % or less, even more preferably 35 mass % or less, and particularly preferably 31 mass % or less when all repeating units in the dispersant are taken to be 100 mass %.

[Acidic Group-Containing Monomer Unit]

Examples of acidic group-containing monomers that can form an acidic group-containing monomer unit include carboxy group-containing monomers, sulfo group-containing monomers, and phosphate group-containing monomers. One acidic group-containing monomer may be used individually, or two or more acidic group-containing monomers may be used in combination in a freely selected ratio.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxy group through hydrolysis can be used as a carboxy group-containing monomer. Of these examples, acrylic acid and methacrylic acid are preferable as carboxy group-containing monomers.

Examples of sulfo group-containing monomers include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

In a case in which the dispersant includes an acidic group-containing monomer unit, the proportional content of acidic group-containing monomer units in the dispersant is, from a viewpoint of further reducing internal resistance of a secondary battery while also further improving high-temperature storage characteristics of the secondary battery, preferably 1 mass % or more, and more preferably 3 mass % or more when all repeating units in the dispersant are taken to be 100 mass %, and is preferably 10 mass % or less, and more preferably 7 mass % or less when all repeating units in the dispersant are taken to be 100 mass %.

[(Meth)Acrylic Acid Ester Monomer Unit]

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. One (meth)acrylic acid ester monomer may be used individually, or two or more (meth)acrylic acid ester monomers may be used in combination in a freely selected ratio.

As described above, the dispersant may include a (meth)acrylic acid ester monomer unit. However, from a viewpoint of further reducing internal resistance of a secondary battery while also further improving high-temperature storage characteristics of the secondary battery, the proportional content of (meth)acrylic acid ester monomer units in the dispersant when all repeating units in the dispersant are taken to be 100 mass % is preferably 30 mass % or less, more preferably 15 mass % or less, even more preferably 10 mass % or less, further preferably 5 mass % or less, particularly preferably 1 mass % or less, and most preferably 0 mass % (i.e., the dispersant most preferably does not include a (meth)acrylic acid ester monomer unit).

<<Production Method>>

No specific limitations are placed on the method by which the dispersant is produced. For example, the dispersant may be produced by performing polymerization in an aqueous solvent with respect to a monomer composition that contains one monomer or two or more monomers and then optionally performing hydrogenation. Note that the proportional content of each monomer in the monomer composition can be set in accordance with the desired proportional content of each repeating unit (monomer unit and/or structural unit) in the polymer.

The polymerization method is not specifically limited and may be solution polymerization, suspension polymerization, bulk polymerization, emulsion polymerization, or the like. Moreover, ionic polymerization, radical polymerization, living radical polymerization, various types of condensation polymerization, addition polymerization, or the like may be adopted as the polymerization reaction. A known emulsifier and/or polymerization initiator may be used in the polymerization as necessary. Moreover, the hydrogenation can be performed by a known method.

<<Hansen Solubility Parameters ($HSP_d$)>>

As previously described, $HSP_d$ includes three parameters: a polarity term $\delta_{p2}$; a dispersion term $\delta_{d2}$; and a hydrogen bonding term $\delta_{h2}$.

The polarity term $\delta_{p2}$ is not specifically limited but is preferably 6.0 $MPa^{1/2}$ or more, and more preferably 7.0 $MPa^{1/2}$ or more, and is preferably 15.0 $MPa^{1/2}$ or less, and more preferably 10.0 $MPa^{1/2}$ or less.

Moreover, the dispersion term $\delta_{d2}$ is not specifically limited but is preferably 10.0 $MPa^{1/2}$ or more, and more preferably 15.0 $MPa^{1/2}$ or more, and is preferably 25.0 $MPa^{1/2}$ or less, and more preferably 20.0 $MPa^{1/2}$ or less.

Furthermore, the hydrogen bonding term $\delta_{h2}$ is not specifically limited but is preferably 1.0 $MPa^{1/2}$ or more, more preferably 2.0 MPa$^{1/2}$ or more, and even more preferably 4.0 MPa$^{1/2}$ or more, and is preferably 15.0 MPa$^{1/2}$ or less, more preferably 10.0 MPa$^{1/2}$ or less, and even more preferably 8.0 MPa$^{1/2}$ or less.

Note that the Hansen solubility parameters (HSP$_d$) of the dispersant can be adjusted by altering the types and proportions of monomers used in production of the dispersant, the proportion constituted by 1,2-bonded hydrogenated butadiene units among all hydrogenated 1,3-butadiene units, the production conditions of the dispersant, and so forth.

<<Content>>

The content of the dispersant in the conductive material dispersion liquid is not specifically limited but is preferably 1 part by mass or more, more preferably 5 parts by mass or more, and even more preferably 10 parts by mass or more per 100 parts by mass of the carbon material, and is preferably 100 parts by mass or less, more preferably 70 parts by mass or less, even more preferably 50 parts by mass or less, and particularly preferably 30 parts by mass or less per 100 parts by mass of the carbon material. When the content of the dispersant is within any of the ranges set forth above, the carbon material can be dispersed well in the conductive material dispersion liquid, and viscosity stability of the conductive material dispersion liquid can be ensured. Moreover, internal resistance of a secondary battery can be further reduced while also further improving high-temperature storage characteristics of the secondary battery.

<<HSP Distance (R$_d$) of HSP$_c$ and HSP$_{d>>}$

The HSP distance (R$_d$) of HSP$_c$ and HSP$_d$ in the presently disclosed conductive material dispersion liquid is required to be 10.0 MPa$^{1/2}$ or less, and is preferably 8.0 MPa$^{1/2}$ or less, more preferably 6.0 MPa$^{1/2}$ or less, even more preferably 4.0 MPa$^{1/2}$ or less, and particularly preferably 3.8 MPa$^{1/2}$ or less. In a situation in which the HSP distance (R$_d$) exceeds 10.0 MPa$^{1/2}$, internal resistance of a secondary battery increases, and high-temperature storage characteristics of the secondary battery are lost. Moreover, the carbon material cannot be dispersed well in the conductive material dispersion liquid, and viscosity stability of the conductive material dispersion liquid is lost.

The lower limit for the HSP distance (R$_d$) is not specifically limited, but is 0 MPa$^{1/2}$ or more, and can be set as 1.0 MPa$^{1/2}$ or more, for example.

<Dispersion Medium>

Although either of water or an organic solvent can be used as the dispersion medium, an organic solvent is preferable. Examples of organic solvents that may be used include, but are not specifically limited to, alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide organic solvents such as N,N-dimethylformamide and N-methyl-2-pyrrolidone (NMP); and aromatic hydrocarbons such as toluene, xylene, chlorobenzene, orthodichlorobenzene, and paradichlorobenzene. The dispersion medium may be one type used individually or two or more types used in combination in a freely selected ratio. From a viewpoint of dispersing the carbon material well in the conductive material dispersion liquid, the dispersion medium is preferably an organic solvent, and more preferably NMP.

<Other Components>

No specific limitations are placed on other components that can be contained in the conductive material dispersion liquid, and components other than a positive electrode active material subsequently described in the "Slurry for secondary battery positive electrode" section may be used.

<Production Method of Conductive Material Dispersion Liquid>

No specific limitations are placed on the mixing method that is adopted when mixing the components described above to obtain the conductive material dispersion liquid. For example, a typical mixing device such as a disper blade, a mill, or a kneader may be used.

(Slurry for Secondary Battery Positive Electrode)

The presently disclosed slurry for a positive electrode contains the conductive material dispersion liquid set forth above and a positive electrode active material and may contain optional components such as a binder as necessary. In other words, the presently disclosed slurry for a positive electrode contains a carbon material, a dispersant, and a dispersion medium and may contain optional components such as a binder as necessary.

Through a positive electrode including a positive electrode mixed material layer formed from a slurry for a positive electrode that contains the conductive material dispersion liquid set forth above in this manner, it is possible to reduce internal resistance of a secondary battery and to ensure good high-temperature storage characteristics of the secondary battery.

<Positive Electrode Active Material>

The positive electrode active material that is compounded in the slurry for a positive electrode can be a known positive electrode active material without any specific limitations.

A positive electrode active material that is used in a lithium ion secondary battery, for example, may be a metal oxide that contains lithium (Li) without any specific limitations. The positive electrode active material is preferably a positive electrode active material that contains one or more selected from the group consisting of cobalt (Co), nickel (Ni), and manganese (Mn) in addition to lithium (Li). Examples of such positive electrode active materials include lithium-containing cobalt oxide (LiCoO$_2$), lithium manganate (LiMn$_2$O$_4$), lithium-containing nickel oxide (LiNiO$_2$), a lithium-containing complex oxide of Co—Ni—Mn, a lithium-containing complex oxide of Ni—Mn—Al, a lithium-containing complex oxide of Ni—Co—Al, olivine-type lithium manganese phosphate (LiMnPO$_4$), a lithium-rich spinel compound represented by Li$_{1+x}$Mn$_{2-x}$O$_4$ (0<x<2), Li[Ni$_{0.17}$Li$_{0.2}$Co$_{0.07}$Mn$_{0.56}$]O$_2$, and LiNi$_{0.5}$Mn$_{1.5}$O$_4$. One positive electrode active material may be used individually, or two or more positive electrode active materials may be used in combination in a freely selected ratio.

From a viewpoint of further increasing the capacity of a lithium ion secondary battery, it is preferable to use a positive electrode active material in which the proportion of nickel is not less than 50.0 mol % and not more than 100.0 mol % when the total amount of contained transition metal is taken to be 100.0 mol %.

The particle diameter of the positive electrode active material is not specifically limited and may be the same as that of a conventionally used positive electrode active material.

The amount of the positive electrode active material in the slurry for a positive electrode is also not specifically limited and may be within a typically used range.

<Optional Components>

Examples of optional components that can be contained in the slurry for a positive electrode include binders, viscosity modifiers, reinforcing materials, antioxidants, and additives for electrolyte solution having a function of inhibiting decomposition of electrolyte solution. One of these optional components may be used individually, or two or more of these optional components may be used in combination in a freely selected ratio.

Of the optional components described above, the inclusion of a binder in the slurry for a positive electrode is preferable from a viewpoint of inhibiting sedimentation of the positive electrode active material while also causing an obtained positive electrode mixed material layer to closely adhere well to a current collector.

<<Binder>>

The binder is not specifically limited but is, for example, preferably polyacrylonitrile (PAN), polyvinyl alcohol (PVOH), or a fluorine-containing resin such as polyvinylidene fluoride, and more preferably a fluorine-containing resin or PAN.

[Hansen Solubility Parameters ($HSP_b$)]

As previously described, $HSP_b$ includes three parameters: a polarity term $\delta_{p3}$; a dispersion term $\delta_{d3}$; and a hydrogen bonding term $\delta_{h3}$.

The polarity term $\delta_{p3}$ is not specifically limited but is preferably 5.0 $MPa^{1/2}$ or more, and more preferably 10.0 $MPa^{1/2}$ or more, and is preferably 25.0 $MPa^{1/2}$ or less, and more preferably 20.0 $MPa^{1/2}$ or less.

Moreover, the dispersion term $\delta_{d3}$ is not specifically limited but is preferably 10.0 $MPa^{1/2}$ or more, and more preferably 15.0 $MPa^{1/2}$ or more, and is preferably 30.0 $MPa^{1/2}$ or less, and more preferably 20.0 $MPa^{1/2}$ or less.

Furthermore, the hydrogen bonding term $\delta_{h3}$ is not specifically limited but is preferably 5.0 $MPa^{1/2}$ or more, and more preferably 10.0 $MPa^{1/2}$ or more, and is preferably 25.0 $MPa^{1/2}$ or less, and more preferably 20.0 $MPa^{1/2}$ or less.

Note that the Hansen solubility parameters ($HSP_b$) of the binder can be adjusted by altering the types and proportions of monomers used in production of the binder, the production conditions of the binder, and so forth.

[HSP Distance ($R_b$) of $HSP_c$ and $HSP_b$]

In the presently disclosed slurry for a positive electrode, the HSP distance ($R_b$) of $HSP_c$ of the carbon material and $HSP_b$ of the binder is preferably larger than the HSP distance ($R_d$) of $HSP_c$ of the carbon material and $HSP_d$ of the dispersant. When the HSP distance ($R_b$) is larger than the HSP distance ($R_d$), the binder does not excessively interfere with interactions between the dispersant and the carbon material in the slurry for a positive electrode, and a good dispersion state of these components can be maintained. Consequently, internal resistance of a secondary battery can be further reduced by using this slurry for a positive electrode.

More specifically, the HSP distance ($R_b$) is preferably more than 4.0 $MPa^{1/2}$, more preferably more than 6.0 $MPa^{1/2}$, even more preferably more than 8.0 $MPa^{1/2}$, and particularly preferably more than 10.0 $MPa^{1/2}$ from a viewpoint of further reducing internal resistance of a secondary battery. The upper limit for the HSP distance ($R_b$) is not specifically limited but can be set as 40.0 $MPa^{1/2}$ or less, for example.

<Production Method of Slurry for Positive Electrode>

No specific limitations are placed on the mixing method that is adopted when mixing the components described above to obtain the slurry for a positive electrode. For example, a typical mixing device such as a disper blade, a mill, or a kneader may be used.

(Positive Electrode for Secondary Battery)

The presently disclosed positive electrode includes a positive electrode mixed material layer obtained using the presently disclosed slurry for a positive electrode set forth above.

More specifically, the presently disclosed positive electrode normally includes the positive electrode mixed material layer on a current collector. The positive electrode mixed material layer contains a positive electrode active material, a conductive material, and a dispersant, and may optionally contain a binder and the like. Note that the positive electrode active material, conductive material, dispersant, binder, and so forth that are contained in the positive electrode mixed material layer are components that were contained in the presently disclosed conductive material dispersion liquid and slurry for a positive electrode, and the preferred ratio of each of these components is the same as the preferred ratio of each component in the presently disclosed conductive material dispersion liquid and slurry for a positive electrode.

The presently disclosed positive electrode can reduce internal resistance of a secondary battery and ensure good high-temperature storage characteristics of the secondary battery as a result of including a positive electrode mixed material layer that is formed using the presently disclosed slurry for a positive electrode set forth above.

<Current Collector>

The current collector is made of a material having electrical conductivity and electrochemical durability. Specifically, the current collector may be made of aluminum or an aluminum alloy. Moreover, aluminum and an aluminum alloy may be used in combination, or different types of aluminum alloys may be used in combination. Aluminum and aluminum alloys are excellent current collector materials due to being heat resistant and electrochemically stable.

<Production Method of Positive Electrode>

No specific limitations are placed on the method by which the presently disclosed positive electrode is produced. For example, the presently disclosed positive electrode can be produced by applying the presently disclosed slurry for a positive electrode set forth above onto at least one side of the current collector and then drying the slurry for a positive electrode to form a positive electrode mixed material layer. In more detail, this production method includes a step of applying the slurry for a positive electrode onto at least one side of the current collector (application step) and a step of drying the slurry for a positive electrode that has been applied onto at least one side of the current collector to form a positive electrode mixed material layer on the current collector (drying step).

<<Application Step>>

The method by which the slurry for a positive electrode is applied onto the current collector is not specifically limited and may be a commonly known method. Specific examples of application methods that can be used include doctor blading, dip coating, reverse roll coating, direct roll coating, gravure coating, extrusion coating, and brush coating. During application, the slurry for a positive electrode may be applied onto just one side of the current collector or both sides of the current collector. The thickness of the slurry coating on the current collector after application but before drying may be set as appropriate in accordance with the thickness of the positive electrode mixed material layer to be obtained after drying.

<<Drying Step>>

The slurry for a positive electrode on the current collector may be dried by any commonly known method without any specific limitations. Examples of drying methods that can be used include drying by warm, hot, or low-humidity air;

drying in a vacuum; and drying by irradiation with infrared light, electron beams, or the like. Through drying of the slurry for a positive electrode on the current collector in this manner, a positive electrode mixed material layer can be formed on the current collector to thereby obtain a positive electrode including the current collector and the positive electrode mixed material layer.

After the drying step, the positive electrode mixed material layer may be further subjected to a pressing process such as mold pressing or roll pressing. The pressing process can cause the positive electrode mixed material layer to closely adhere well to the current collector.

Moreover, in a case in which the positive electrode mixed material layer contains a curable polymer, this polymer may be cured after formation of the positive electrode mixed material layer.

(Secondary Battery)

The presently disclosed secondary battery includes the presently disclosed positive electrode set forth above. The presently disclosed secondary battery has reduced internal resistance and excellent high-temperature storage characteristics as a result of including the presently disclosed positive electrode. The presently disclosed secondary battery may be a non-aqueous secondary battery, for example, and is preferably a lithium ion secondary battery.

The following describes the configuration of a lithium ion secondary battery as one example of the presently disclosed secondary battery. This lithium ion secondary battery typically includes a negative electrode, an electrolyte solution, and a separator in addition to the presently disclosed positive electrode. The following describes each of these constituents.

<Negative Electrode>

The negative electrode of the lithium ion secondary battery may be any known negative electrode that is used as a negative electrode of a lithium ion secondary battery. Specifically, the negative electrode may, for example, be a negative electrode formed of a thin sheet of lithium metal or a negative electrode obtained by forming a negative electrode mixed material layer on a current collector.

The current collector may be made of a metal material such as iron, copper, aluminum, nickel, stainless steel, titanium, tantalum, gold, or platinum. The negative electrode mixed material layer may be a layer that contains a negative electrode active material and a binder. The binder is not specifically limited and may be freely selected from known materials.

<Electrolyte Solution>

The electrolyte solution is normally an organic electrolyte solution obtained by dissolving a supporting electrolyte in an organic solvent. The supporting electrolyte may, for example, be a lithium salt. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and methyl ethyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region, and a mixture of ethylene carbonate and ethyl methyl carbonate is more preferable.

The concentration of the electrolyte in the electrolyte solution can be adjusted as appropriate and may, for example, be preferably 0.5 mass % to 15 mass %, more preferably 2 mass % to 13 mass %, and even more preferably 5 mass % to 10 mass %. Moreover, a known additive such as fluoroethylene carbonate or ethyl methyl sulfone may be added to the electrolyte solution.

<Separator>

The separator is not specifically limited and may be any of those described in JP2012-204303A, for example. Of these separators, a microporous membrane made of polyolefinic (polyethylene, polypropylene, polybutene, or polyvinyl chloride) resin is preferred since such a membrane can reduce the total thickness of the separator, which increases the ratio of electrode active material in the lithium ion secondary battery, and consequently increases the volumetric capacity.

<Production Method of Lithium Ion Secondary Battery>

The lithium ion secondary battery conforming with the present disclosure can be produced by, for example, stacking the positive electrode and the negative electrode with the separator in-between, performing rolling, folding, or the like of the resultant laminate in accordance with the battery shape, as necessary, to place the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the following methods were used to evaluate the Hansen solubility parameters of a carbon material, a dispersant, and a binder, the proportion constituted by 1,2-bonded hydrogenated butadiene units among all hydrogenated 1,3-butadiene units in a dispersant, the dispersion state and viscosity stability of a conductive material dispersion liquid, and the reduction of internal resistance and high-temperature storage characteristics of a secondary battery.

<Hansen Solubility Parameters>

<<$HSP_c$ of Carbon Material>>

For each of 16 types of solvents shown in Table 1 described below, 0.1 g of a carbon material was added to 10 mL of the solvent and was ultrasonically dispersed under conditions of 10 minutes at 20 kHz and 200 W to obtain a measurement liquid. Pulse NMR measurement was performed for each of the 16 types of solvents (pure solvents) and for each of the measurement liquids. $R_{sp}$ was calculated from the obtained results by the following formula as a function of the relaxation time T1 of the pure solvent and the relaxation time T2 of the solvent in the measurement liquid.

$$R_{sp}=(T1/T2)-1$$

Scoring of the affinity of each solvent and the carbon material was performed from the obtained value for $R_{sp}$ as indicated below.

$R_{sp} \leq 0.2$ (poor solvent): 0

$0.2 < R_{sp} \leq 0.5$ (poor solvent): 2

$0.5 < R_{sp}$ (good solvent): 1

The polarity term $\delta_{p1}$, dispersion term $\delta_{d1}$, and hydrogen bonding term $\delta_{h1}$ of $HSP_c$ were then determined in accordance with the obtained score using computer software "Hansen Solubility Parameters in Practice (HSPiP ver. 5.2.05)".

<<$HSP_d$ of Dispersant>>

For each of 15 types of solvents shown in Table 2 described below, 0.5 g of a dispersant was added to 10 mL of the solvent and was left at rest at 25° C. for 24 hours to obtain an evaluation liquid. Scoring of this evaluation liquid was performed as follows through visual inspection.

Not dissolved (poor solvent): 0

State having turbidity and/or fluctuation (poor solvent): 2

Completely dissolved (good solvent): 1

The polarity term $\delta_{p2}$, dispersion term $\delta_{d2}$, and hydrogen bonding term $\delta_{h2}$ of $HSP_d$ were then determined in accordance with the obtained score using HSPiP described above.

<<$HSP_b$ of Binder>>

Note that although $HSP_b$ of a binder can be determined in the same manner as described in "$HSP_d$ of dispersant", values from the database of HSPiP were adopted herein.

<Proportion Constituted by 1,2-Bonded Hydrogenated Butadiene Units Among all Hydrogenated 1,3-Butadiene Units in Dispersant>

A water dispersion of a polymer was vacuum dried at 60° C. for 24 hours. Thereafter, quantification of 1,4-bonded 1,3-butadiene units (amount of 1,4-bonding) and 1,2-bonded 1,3-butadiene units (amount of 1,2-bonding) was performed, and a calculation was made by the following formula.

Proportion constituted by 1,2-bonded hydrogenated butadiene units among all hydrogenated 1,3-butadiene units in dispersant=(Amount of 1,2-bonding)/(Amount of 1,2-bonding+Amount of 1,4-bonding)×100 (mass %)

<Dispersion State>

The shear rate dependence of viscosity of a conductive material dispersion liquid at a temperature of 25° C. was evaluated using a rheometer (produced by Anton Paar GmbH; product name: MCR302).

An evaluation was made by the following standard using the viscosity $\eta_{10}$ at a shear rate of 10 s$^{-1}$ as an index. A lower viscosity $\eta_{10}$ indicates that the conductive material dispersion liquid has a better dispersion state.

A: $\eta_{10}$ of 5 Pa·s or less

B: $\eta_{10}$ of more than 5 Pa·s and not more than 10 Pa·s

C: $\eta_{10}$ of more than 10 Pa·s and not more than 20 Pa·s

D: Excessive viscosity and $\eta_{10}$ not measurable

<Viscosity Stability>

The initial viscosity of a conductive material dispersion liquid straight after production was measured using a B-type viscometer at a temperature of 25° C., a rotation speed of 60 rpm, and rotation time of 60 seconds. In addition, the post-storage viscosity $\eta_{7d}$ of the conductive material dispersion liquid after being stored at rest at normal temperature for 7 days after production was measured under the same conditions as for $\eta_{ini}$. A viscosity ratio was then calculated by the following formula.

$$\text{Viscosity ratio} = \eta_{7d}/\eta_{ini} \times 100 (\%)$$

The obtained viscosity ratio was used to make an evaluation by the following standard. A value of closer to 100% for the viscosity ratio indicates that there is a smaller change of viscosity of the conductive material dispersion liquid due to long-term storage and that the conductive material dispersion liquid has better viscosity stability.

A: Viscosity ratio of not less than 70% and not more than 130%

B: Viscosity ratio of not less than 50% and less than 70% or viscosity ratio of more than 130% and not more than 150%

C: Viscosity ratio of not less than 0% and less than 50% or viscosity ratio of more than 150% and not more than 200%

<Reduction of Internal Resistance>

A lithium ion secondary battery was constant-current charged to a battery voltage of 4.2 V at 0.2 CmA and was then constant-voltage charged at 4.2 V until the charging current reached 0.02 CmA. Next, the lithium ion secondary battery was constant-current discharged to a battery voltage of 3.87 V (SOC (State Of Charge): 50%) at 0.2 CmA, and then the voltage change after 30 seconds of discharging was measured at each of 0.2 CmA, 0.5 CmA, 1.0 CmA, 2.0 CmA, 2.5 CmA, and 3.0 CmA. A plot was made of each of the discharge currents and the measured voltage change, and the gradient of this plot was taken to be a resistance value (a). The calculated resistance value was evaluated by the following standard. A lower resistance value indicates that the lithium ion secondary battery has lower internal resistance.

A: Resistance value of less than 2 Ω

B: Resistance value of not less than 2Ω and less than 4 Ω

C: Resistance value of not less than 4Ω and less than 6 Ω

D: Resistance value of 6Ω or more

<High-Temperature Storage Characteristics>

The volume ($V_{ini}$) of a lithium ion secondary battery was measured by the Archimedes method. Next, this lithium ion secondary battery was constant-current charged to a battery voltage of 4.2 V at 0.2 CmA and then constant-voltage charged at 4.2 V until the charging current reached 0.02 CmA in a 25° C. environment. The lithium ion secondary battery was removed from the charging device, was stored in a 60° C. environment for 7 days, was cooled to 25° C., and then the volume ($V_{7d}$) of the lithium ion secondary battery was measured once again by the Archimedes method. The volume change was calculated by the following formula.

$$\text{Volume change} = V_{7d} - V_{ini} \text{ (mL)}$$

The obtained volume change was used to make an evaluation by the following standard. A smaller value for the volume change indicates that the lithium ion secondary battery has better high-temperature storage characteristics.

A: Volume change of less than 2 mL

B: Volume change of not less than 2 mL and less than 3 mL

C: Volume change of not less than 3 mL and less than 4 mL

D: Volume change of 4 mL or more

Example 1

<Production of Carbon Material>
<<Preparation of Substrate for Carbon Nanotube Production>>

An Fe—Cr alloy SUS 430 base plate (produced by JFE Steel; 50 cm×50 cm; thickness: 0.3 mm; Cr: 18%; arithmetic average roughness Ra≈0.59 μm) was prepared as a base plate.

Also, 1.9 g of aluminum tri-sec-butoxide as an aluminum compound was dissolved in 100 mL of 2-propanol as an organic solvent. In addition, 0.9 g of triisopropanolamine as a stabilizer was added and dissolved to produce a coating solution A.

Furthermore, 174 mg of iron acetate as an iron compound was dissolved in 100 mL of 2-propanol as an organic solvent. In addition, 190 mg of triisopropanolamine as a stabilizer was added and dissolved to produce a coating solution B.

The coating solution A described above was applied onto the prepared base plate by dip coating in an environment of 25° C. room temperature and 50% relative humidity. More specifically, the base plate was immersed in the coating solution A, was held in the coating solution A for 20 seconds, and was then pulled up at a pulling speed of 10 mm/s. Thereafter, the base plate was air dried for 5 minutes, was heated in an air environment of 300° C. for 30 minutes, and was then cooled to room temperature so as to form an alumina thin film of 14 nm in thickness on a used substrate.

Next, the coating solution B described above was applied onto the alumina thin film on the base plate by dip coating in an environment of 25° C. room temperature and 50% relative humidity. More specifically, the base plate including the alumina thin film was immersed in the coating solution B, was subsequently held in the coating solution B for 20 seconds, and was then pulled up at a pulling speed of 3 mm/s. Thereafter, the base plate was air dried for 5 minutes (drying temperature 45° C.) so as to form an iron thin film of 1 nm in thickness, and thereby form a catalyst layer of 15 nm in thickness formed of an alumina-iron thin film and obtain a substrate for carbon nanotube production.
<<Synthesis of CNTs>>

Next, a CVD apparatus was used to form an aligned CNT aggregate on the substrate for carbon nanotube production. More specifically, the produced substrate for carbon nanotube production was set up in a reaction chamber of the CVD apparatus in which a furnace internal temperature of 750° C. and a furnace internal pressure of $1.02 \times 10^5$ Pa were maintained, and 100 sccm of He and 900 sccm of $H_2$ were introduced into this reaction chamber for 6 minutes. In this manner, the catalyst (iron) for CNT synthesis was reduced and micronization thereof was promoted such that the catalyst was in a suitable state (state in which numerous catalyst fine particles of nanometer size were formed) for CNT growth (formation step). Note that the density of the catalyst fine particles at this point was adjusted to $1 \times 10^{12}$ to $1 \times 10^{14}$ per cm². Thereafter, 850 sccm of He, 59 sccm of $C_2H_4$, and $H_2O$ in an amount such that the $H_2O$ concentration was 300 ppm were supplied into the reaction chamber for 5 minutes in a state in which a furnace internal temperature of 750° C. and a furnace internal pressure of $1.02 \times 10^5$ Pa were maintained. In this manner, CNTs were grown from the catalyst fine particles (CNT growth step). Once the CNT growth step had ended, 1,000 sccm of only He was supplied into the reaction chamber, and residual feedstock gas and catalyst activating material were expelled. In this manner, a substrate having an aligned carbon nanotube aggregate formed on the surface of a catalyst layer was obtained.

The aligned CNT aggregate that had grown on the catalyst layer was subsequently peeled from the surface of the obtained substrate so as to obtain CNT-A as a carbon material. Scoring of this CNT-A for affinity with each solvent was performed by the previously described method. The results are shown in Table 1. Moreover, the polarity term $\delta_{p1}$, dispersion term $\delta_{d1}$, and hydrogen bonding term $\delta_{h1}$ of $HSP_c$ were calculated. The results are shown in Table 3.
<Production of Dispersant>

A reactor was charged, in order, with 180 parts of deionized water, 25 parts of sodium dodecylbenzenesulfonate aqueous solution (concentration 10%) as an emulsifier, 28 parts of acrylonitrile as a nitrile group-containing monomer, and 0.8 parts of t-dodecyl mercaptan as a molecular weight modifier. Next, gas inside the reactor was purged three times with nitrogen, and then 72 parts of 1,3-butadiene as a conjugated diene monomer was added. The reactor was maintained at 10° C. while 0.1 parts of cumene hydroperoxide as a polymerization initiator was added to initiate a polymerization reaction that was then caused to proceed under stirring.

At the point at which the polymerization conversion rate reached 90%, 0.2 parts of hydroxylamine sulfate was added per 100 parts of monomers to stop the polymerization. Next, heating was performed, residual monomer was collected through steam distillation under reduced pressure at approximately 70° C., and then 2 parts of an alkylated phenol as an antioxidant was added to yield a water dispersion of a polymer. This water dispersion of the polymer was used to measure the proportion constituted by 1,2-bonded hydrogenated butadiene units among all hydrogenated 1,3-butadiene units in a dispersant. The results are shown in Table 3.

Next, 400 mL (total solid content: 48 g) of the obtained water dispersion of the polymer was loaded into a 1 L stirrer-equipped autoclave, and nitrogen gas was passed for 10 minutes so as to remove dissolved oxygen in the water dispersion. Thereafter, 50 mg of palladium acetate as a hydrogenation reaction catalyst was dissolved in 180 mL of water to which nitric acid had been added in an amount of 4 molar equivalents relative to the Pd, and the resultant solution was added into the autoclave. After purging the system twice with hydrogen gas, the contents of the autoclave were heated to 50° C. in a state in which the pressure was raised to 3 MPa with hydrogen gas, and a hydrogenation reaction was performed for 6 hours.

Thereafter, the contents were restored to normal temperature, the system was converted to a nitrogen atmosphere, and then an evaporator was used to perform concentrating to a solid content concentration of 40% to yield hydrogenated nitrile rubber A as a dispersant.

NMP was added to an aqueous solution of the hydrogenated nitrile rubber A as a dispersant with a solid content concentration of 40%, and then water and excess NMP were removed through distillation under reduced pressure to yield an NMP solution of the hydrogenated nitrile rubber A having a solid content concentration of 8%.

Scoring of the obtained hydrogenated nitrile rubber A for affinity with each solvent was performed by the previously described method. The results are shown in Table 2. Moreover, the polarity term $\delta_{p2}$, dispersion term $\delta_{d2}$, and hydrogen bonding term $\delta_{h2}$ of $HSP_d$ were calculated. The results are shown in Table 3.

Furthermore, the HSP distance ($R_a$) of $HSP_c$ and $HSP_d$ was calculated using the previously described formula (1). The result is shown in Table 3.

<Production of Conductive Material Dispersion Liquid>

A disper blade was used to stir (3,000 rpm, 10 minutes) 5.0 parts of CNT-A as a conductive material, 1.0 parts (in terms of solid content) of the hydrogenated nitrile rubber A as a dispersant, and 94.0 parts of NMP as a dispersion medium. Thereafter, 1 hour of dispersing at a circumferential speed of 8 m/s was performed by a bead mill in which zirconia beads of 1 mm in diameter were used to produce a conductive material dispersion liquid having a solid content concentration of 6.0%. The dispersion state and storage stability of the obtained conductive material dispersion liquid were evaluated. The results are shown in Table 3.

<Production of Slurry for Positive Electrode>

A slurry for a positive electrode was produced by adding together 98.0 parts of a ternary active material having a layered structure ($LiNi_{0.5}Co_{0.2}Mn_{0.3}O_2$; average particle diameter: 10 μm) as a positive electrode active material, 1.0 parts of polyvinylidene fluoride as a binder, 1.0 parts (in terms of solid content) of the conductive material dispersion liquid described above, and NMP and performing mixing (60 rpm, 30 minutes) thereof in a planetary mixer. Note that the additive amount of NMP was adjusted such that the viscosity of the obtained slurry composition for a positive electrode (measured by single cylinder rotary viscometer in accordance with JIS Z8803:1991; temperature: 25° C.; rotation speed: 60 rpm) was within a range of 4,000 mPa·s to 5,000 mPa·s.

<Production of Positive Electrode>

Aluminum foil of 20 μm in thickness was prepared as a current collector. The slurry for a positive electrode was applied onto the aluminum foil by a comma coater such as to have a coating weight after drying of 20 mg/cm², was dried at 90° C. for 20 minutes and at 120° C. for 20 minutes, and was then heat treated at 60° C. for 10 hours to obtain a positive electrode web. This positive electrode web was rolled by roll pressing to produce a sheet-shaped positive electrode including aluminum foil and a positive electrode mixed material layer of 3.2 g/cm³ in density. The thickness of the sheet-shaped positive electrode was 70 μm. This sheet-shaped positive electrode was cut to 4.8 mm in width and 50 cm in length to obtain a positive electrode for a lithium ion secondary battery.

<Production of Negative Electrode>

A slurry for a negative electrode was produced by stirring a mixture of 90 parts of spherical artificial graphite (volume-average particle diameter: 12 μm) and 10 parts of $SiO_x$ (volume-average particle diameter: 10 μm) as negative electrode active materials with 1 part of a styrene butadiene polymer as a binder, 1 part of carboxymethyl cellulose as a thickener, and an appropriate amount of water as a dispersion medium in a planetary mixer.

Next, copper foil of 15 μm in thickness was prepared as a current collector. The slurry composition for a negative electrode was applied onto both sides of the copper foil such as to have a coating weight after drying of 10 mg/cm² at each side, and was dried at 60° C. for 20 minutes and at 120° C. for 20 minutes. Thereafter, 2 hours of heat treatment was performed at 150° C. to obtain a negative electrode web. This negative electrode web was rolled by roll pressing to produce a sheet-shaped negative electrode including copper foil and negative electrode mixed material layers (both sides) of 1.8 g/cm³ in density. The sheet-shaped negative electrode was cut to 5.0 mm in width and 52 cm in length to obtain a negative electrode for a lithium ion secondary battery.

<Preparation of Separator>

A separator made of a single layer of polypropylene (produced by Celgard, LLC.; product name: Celgard 2500; thickness: 15 μm) was cut out as 120 cm×5.5 cm.

<Production of Secondary Battery>

The positive electrode and the negative electrode were wound up with the separator in-between using a core of 20 mm in diameter so as to obtain a roll. The obtained roll was compressed to a thickness of 4.5 mm from one direction at a rate of 10 mm/s. Note that the compressed roll had an elliptical shape in plan view, and the ratio of the major axis to the minor axis (major axis/minor axis) was 7.7.

In addition, an electrolyte solution (chemical composition: $LiPF_6$ solution of 1.0 M in concentration (solvent: mixed solution obtained by adding 5 mass % of fluoroethylene carbonate to a mixed solvent of ethylene carbonate/ethyl methyl carbonate=3/7 (mass ratio); additive: 2 volume % of vinylene carbonate)) was prepared.

Thereafter, the compressed roll was housed inside a laminate case made of aluminum together with 3.2 g of the non-aqueous electrolyte solution. A nickel lead was connected to a specific location on the negative electrode, an aluminum lead was connected to a specific location on the positive electrode, and then an opening of the case was heat sealed so as to obtain a lithium ion secondary battery. This lithium ion secondary battery had a pouch shape of 35 mm in width, 48 mm in height, and 5 mm in thickness, and the nominal capacity of the battery was 700 mAh. Reduction of internal resistance and high-temperature storage characteristics were evaluated for the obtained lithium ion secondary battery. The results are shown in Table 3.

Example 2

A carbon material, a dispersant, a conductive material dispersion liquid, a slurry for a positive electrode, a positive electrode, a negative electrode, a separator, and a secondary battery were prepared in the same way as in Example 1 with the exception that polyacrylonitrile was used instead of polyvinylidene fluoride as a binder in production of the slurry for a positive electrode. Various evaluations were also performed. The results are shown in Table 3.

Example 3

A dispersant, a conductive material dispersion liquid, a slurry for a positive electrode, a positive electrode, a negative electrode, a separator, and a secondary battery were prepared in the same way as in Example 1 with the exception that CNT-B produced as described below was used as a carbon material in production of the conductive material dispersion liquid. Various evaluations were also performed. The results are shown in Tables 1 and 3.

<Production of Carbon Material (CNT-B)>

CNT-A produced in the same way as in Example 1 was added, in an amount of 10 g, to 1 L of aqueous ozone having a dissolved ozone concentration of 5 mg/L and was stirred therewith at 20° C. for 5 hours. Next, solid content (CNTs) was collected by filtration and was dried under reduced pressure at 100° C. to yield CNT-B.

Example 4

A dispersant, a conductive material dispersion liquid, a slurry for a positive electrode, a positive electrode, a negative electrode, a separator, and a secondary battery were prepared in the same way as in Example 1 with the exception that CNT-C produced as described below was used as a carbon material in production of the conductive material dispersion liquid. Various evaluations were also performed. The results are shown in Tables 1 and 3.

<Production of Carbon Material (CNT-C)>

CNT-A produced in the same way as in Example 1 was added, in an amount of 10 g, to 1 L of aqueous ozone having a dissolved ozone concentration of 5 mg/L and was stirred therewith at 20° C. for 10 hours. Next, solid content (CNTs) was collected by filtration and was dried under reduced pressure at 100° C. to yield CNT-C.

Example 5

A carbon material, a conductive material dispersion liquid, a slurry for a positive electrode, a positive electrode, a negative electrode, a separator, and a secondary battery were prepared in the same way as in Example 1 with the exception that hydrogenated nitrile rubber B produced as described below was used as a dispersant in production of the conductive material dispersion liquid. Various evaluations were also performed. The results are shown in Tables 2 and 3.

<Production of Dispersant (Hydrogenated Nitrile Rubber B)>

A reactor was charged, in order, with 180 parts of deionized water, 25 parts of sodium dodecylbenzenesulfonate aqueous solution (concentration 10%) as an emulsifier, 28 parts of acrylonitrile as a nitrile group-containing monomer, and 0.8 parts of t-dodecyl mercaptan as a molecular weight modifier. Next, gas inside the reactor was purged three times with nitrogen, and then 72 parts of 1,3-butadiene as a conjugated diene monomer was added. The reactor was maintained at 30° C. while 0.1 parts of potassium persulfate as a polymerization initiator was added to initiate a polymerization reaction that was then caused to proceed under stirring.

At the point at which the polymerization conversion rate reached 90%, 0.2 parts of hydroxylamine sulfate was added per 100 parts of monomers to stop the polymerization. Next, heating was performed, residual monomer was collected through steam distillation under reduced pressure at approximately 70° C., and then 2 parts of an alkylated phenol as an antioxidant was added to yield a water dispersion of a polymer.

Subsequent operations were performed in the same way as in Example 1 to yield an NMP solution of hydrogenated nitrile rubber B having a solid content concentration of 8%.

Example 6

A conductive material dispersion liquid and a slurry for a positive electrode were produced as described below. With the exception of the above, a dispersant, a positive electrode, a negative electrode, a separator, and a secondary battery were prepared in the same way as in Example 1. Various evaluations were also performed. The results are shown in Tables 1 and 3.

<Production of Conductive Material Dispersion Liquid>

A disper blade was used to stir (3,000 rpm, 10 minutes) 18.0 parts of carbon black (produced by Timcal; product name: Super-T; hereinafter, referred to as "CB-A") as a conductive material, 1.8 parts (in terms of solid content) of hydrogenated nitrile rubber A as a dispersant obtained in the same way as in Example 1, and 80.2 parts of NMP. Thereafter, 1 hour of dispersing was performed at a circumferential speed of 8 m/s by a bead mill in which zirconia beads of 1 mm in diameter were used to produce a conductive material dispersion liquid having a solid content concentration of 19.8%.

<Production of Slurry for Positive Electrode>

A slurry for a positive electrode was produced by adding together 96.0 parts of a ternary active material having a layered structure ($LiNi_{0.5}Co_{0.2}Mn_{0.3}O_2$; average particle diameter: 10 μm) as a positive electrode active material, 1.0 parts of polyvinylidene fluoride as a binder, 3.0 parts (in terms of solid content) of the conductive material dispersion liquid described above, and NMP and performing mixing (60 rpm, 30 minutes) thereof in a planetary mixer. Note that the additive amount of NMP was adjusted such that the viscosity of the obtained slurry composition for a positive electrode (measured by single cylinder rotary viscometer in accordance with JIS Z8803:1991; temperature: 25° C.; rotation speed: 60 rpm) was within a range of 4,000 mPa·s to 5,000 mPa·s.

Example 7

A dispersant, a conductive material dispersion liquid, a slurry for a positive electrode, a positive electrode, a negative electrode, a separator, and a secondary battery were prepared in the same way as in Example 6 with the exception that CB-B produced as described below was used as a carbon material in production of the conductive material dispersion liquid. Various evaluations were also performed. The results are shown in Tables 1 and 4.

<Production of Carbon Material (CB-B)>

CB-A was added, in an amount of 10 g, to 1 L of aqueous ozone having a dissolved ozone concentration of 5 mg/L and was stirred therewith at 20° C. for 5 hours. Next, solid content (carbon black) was collected by filtration and was dried under reduced pressure at 100° C. to produce CB-B.

Example 8

A carbon material, a conductive material dispersion liquid, a slurry for a positive electrode, a positive electrode, a negative electrode, a separator, and a secondary battery were prepared in the same way as in Example 1 with the exception that hydrogenated styrene-butadiene-nitrile rubber produced as described below was used as a dispersant in production of the conductive material dispersion liquid. Various evaluations were also performed. The results are shown in Tables 2 and 4.

<Production of Dispersant (Hydrogenated Styrene-Butadiene-Nitrile Rubber)>

A reactor was charged, in order, with 180 parts of deionized water, 25 parts of sodium dodecylbenzenesulfonate aqueous solution (concentration 10%) as an emulsifier, 31 parts of styrene as an aromatic vinyl monomer, 7 parts of acrylonitrile as a nitrile group-containing monomer, 7 parts of methacrylic acid as an acidic group-containing monomer, and 2.0 parts of t-dodecyl mercaptan as a molecular weight modifier. Next, gas inside the reactor was purged three times with nitrogen, and then 55 parts of 1,3-butadiene as a conjugated diene monomer was added.

Subsequent operations were performed in the same way as in Example 1 to yield an NMP solution of hydrogenated styrene-butadiene-nitrile rubber having a solid content concentration of 8%.

Comparative Examples 1, 2, and 3

A carbon material, a conductive material dispersion liquid, a slurry for a positive electrode, a positive electrode, a negative electrode, a separator, and a secondary battery were prepared in the same way as in each of Examples 1, 3, and 6 with the exception that polyvinylpyrrolidone was used instead of the hydrogenated nitrile rubber A as a dispersant in production of the conductive material dispersion liquid. Various evaluations were also performed. The results are shown in Table 4.

Comparative Example 4

A carbon material, a conductive material dispersion liquid, a slurry for a positive electrode, a positive electrode, a negative electrode, a separator, and a secondary battery were prepared in the same way as in Example 1 with the exception that polyvinyl butyral was used instead of the hydrogenated nitrile rubber A as a dispersant in production of the conductive material dispersion liquid. Various evaluations were also performed. The results are shown in Table 4.

In Tables 2 to 4:

"HNBR-A" indicates hydrogenated nitrile rubber A;

"HNBR-B" indicates hydrogenated nitrile rubber B;

"HSNBR" indicates hydrogenated styrene-butadiene-nitrile rubber;

"AN units" indicates acrylonitrile units;

"ST units" indicates styrene units;

"H-BD units" indicates hydrogenated 1,3-butadiene units;

"MAA units" indicates methacrylic acid units;

"1,2-Bonded H-BD units" indicates 1,2-bonded hydrogenated butadiene units;

"PVP" indicates polyvinylpyrrolidone;

"PVB" indicates polyvinyl butyral;

"PVdF" indicates polyvinylidene fluoride;

"PAN" indicates polyacrylonitrile; and

"NCM" indicates $LiNi_{0.5}Co_{0.2}Mn_{0.3}O_2$.

TABLE 1

| No. | Solvent | CNT-A | CNT-B | CNT-C | CB-A | CB-B |
|---|---|---|---|---|---|---|
| 1 | Acetone | 0 | 0 | 1 | 1 | 0 |
| 2 | Toluene | 1 | 0 | 0 | 0 | 0 |
| 3 | Ethanol | 0 | 0 | 0 | 0 | 0 |
| 4 | Tetrahydrofuran | 0 | 0 | 0 | 2 | 0 |
| 5 | Dimethylformamide | 0 | 0 | 0 | 0 | 0 |
| 6 | Hexane | 0 | 0 | 0 | 0 | 0 |
| 7 | Methyl ethyl ketone | 0 | 0 | 1 | 1 | 0 |
| 8 | Benzyl alcohol | 0 | 0 | 0 | 0 | 0 |
| 9 | Ethyl acetate | 0 | 0 | 0 | 0 | 0 |
| 10 | Dimethyl sulfoxide | 0 | 0 | 0 | 0 | 0 |
| 11 | γ-Butyrolactone | 0 | 1 | 0 | 0 | 1 |
| 12 | Nitrobenzene | 1 | 0 | 0 | 0 | 0 |
| 13 | Propylene glycol monomethyl ether | 0 | 1 | 0 | 0 | 0 |
| 14 | N-Methyl-2-pyrrolidone | 0 | 1 | 1 | 1 | 1 |
| 15 | Quinoline | 0 | 0 | 0 | 0 | 0 |
| 16 | Methyl acetate | 0 | 0 | 0 | 0 | 0 |

TABLE 2

| No. | Solvent | HNBR-A | HSNBR | HNBR-B |
|---|---|---|---|---|
| 1 | Acetone | 2 | 2 | 1 |
| 2 | Toluene | 0 | 2 | 2 |
| 3 | Ethanol | 0 | 0 | 0 |
| 4 | Tetrahydrofuran | 1 | 1 | 2 |
| 5 | Dimethylformamide | 2 | 1 | 0 |
| 6 | Hexane | 0 | 0 | 0 |
| 7 | Methyl ethyl ketone | 2 | 1 | 0 |
| 8 | Benzyl alcohol | 0 | 1 | 0 |
| 9 | Ethyl acetate | 2 | 0 | 1 |
| 10 | Dimethyl sulfoxide | 0 | 0 | 0 |
| 11 | γ-Butyrolactone | 0 | 1 | 0 |
| 12 | Nitrobenzene | 1 | 1 | 2 |
| 13 | Propylene glycol monomethyl ether | 0 | 0 | 0 |
| 14 | N-Methyl-2-pyrrolidone | 1 | 1 | 0 |
| 15 | Quinoline | 0 | 2 | 0 |

TABLE 3

| | | | | | Example 1 | Example 2 | Example 3 | Example 4 | Example 5 | Example 6 |
|---|---|---|---|---|---|---|---|---|---|---|
| Slurry for positive electrode | Conductive material dispersion liquid | Carbon material | Type | | CNT-A | CNT-A | CNT-B | CNT-C | CNT-A | CB-A |
| | | | HSPc [$MPa^{1/2}$] | $\delta d1$ | 18.6 | 18.6 | 16.8 | 17 | 18.6 | 16.9 |
| | | | | $\delta p1$ | 6.5 | 6.5 | 10.8 | 12.8 | 6.5 | 10.6 |
| | | | | $\delta h1$ | 2.2 | 2.2 | 6.6 | 6.2 | 2.2 | 6.5 |
| | | Dispersant | Type | | HNBR-A | HNBR-A | HNBR-A | HNBR-A | HNBR-B | HNBR-A |
| | | | Chemical composition [mass %] | AN units | 28 | 28 | 28 | 28 | 28 | 28 |
| | | | | ST units | — | — | — | — | — | — |
| | | | | H-BD units | 72 | 72 | 72 | 72 | 72 | 72 |
| | | | | MAA units | — | — | — | — | — | — |
| | | | Proportion constituted by 1,2-bonded H-BD units among all H-BD units [mass %] | | 9.1 | 9.1 | 9.1 | 9.1 | 14.8 | 9.1 |
| | | | HSPd [$MPa^{1/2}$] | $\delta d2$ | 18.4 | 18.4 | 18.4 | 18.4 | 16.5 | 18.4 |
| | | | | $\delta p2$ | 8.2 | 8.2 | 8.2 | 8.2 | 9.8 | 8.2 |
| | | | | $\delta h2$ | 5.6 | 5.6 | 5.6 | 5.6 | 9.5 | 5.6 |
| | | HSP distance (Rd) [$MPa^{1/2}$] | | | 3.8 | 3.8 | 4.2 | 5.4 | 9.0 | 3.9 |
| | Positive electrode active material | | | | NCM | NCM | NCM | NCM | NCM | NCM |
| | Binder | | Type | | PVdF | PAN | PVdF | PVdF | PVdF | PVdF |
| | | | HSPb [$MPa^{1/2}$] | $\delta d3$ | 19.4 | 21.7 | 19.4 | 19.4 | 19.4 | 19.4 |
| | | | | $\delta p3$ | 15.9 | 14.1 | 15.9 | 15.9 | 15.9 | 15.9 |
| | | | | $\delta h3$ | 11.3 | 19.9 | 11.3 | 11.3 | 11.3 | 11.3 |

TABLE 3-continued

|  | Example 1 | Example 2 | Example 3 | Example 4 | Example 5 | Example 6 |
|---|---|---|---|---|---|---|
| HSP distance (Rb) [MPa$^{1/2}$] | 13.2 | 20.2 | 8.7 | 7.7 | 13.2 | 8.7 |
| Dispersion state | A | A | A | A | C | A |
| Viscosity stability | A | A | B | B | A | B |
| Reduction of internal resistance | A | A | A | A | C | B |
| High-temperature storage characteristics | A | A | B | B | C | B |

TABLE 4

| | | | | | | Example 7 | Example 8 | Comparative Example 1 | Comparative Example 2 | Comparative Example 3 | Comparative Example 4 |
|---|---|---|---|---|---|---|---|---|---|---|---|
| Slurry for positive electrode | Conductive material dispersion liquid | Carbon material | Type | | | CB-B | CNT-A | CNT-A | CNT-B | CB-A | CNT-A |
| | | | HSPc [MPa$^{1/2}$] | $\delta d1$ | | 20.7 | 18.6 | 18.6 | 16.8 | 16.9 | 18.6 |
| | | | | $\delta p1$ | | 11.2 | 6.5 | 6.5 | 10.8 | 10.6 | 6.5 |
| | | | | $\delta h1$ | | 11.7 | 2.2 | 2.2 | 6.6 | 6.5 | 2.2 |
| | | Dispersant | Type | | | HNBR-A | HSNBR | PVP | PVP | PVP | PVB |
| | | | Chemical composition [mass %] | AN units | | 28 | 7 | | | | |
| | | | | ST units | | — | 31 | | | | |
| | | | | H-BD units | | 72 | 55 | | | | |
| | | | | MAA units | | — | 7 | | | | |
| | | | Proportion constituted by 1,2-bonded H-BD units among all H-BD units [mass %] | | | 9.1 | 8.9 | | | | |
| | | | HSPd [MPa$^{1/2}$] | $\delta d2$ | | 18.4 | 18.5 | 18.1 | 18.1 | 18.1 | 18.6 |
| | | | | $\delta p2$ | | 8.2 | 9.6 | 10 | 10 | 10 | 4.4 |
| | | | | $\delta h2$ | | 5.6 | 8.5 | 18 | 18 | 18 | 13 |
| | | HSP distance (Rd) MPa$^{1/2}$ | | | | 8.2 | 7.0 | 16.2 | 11.7 | 11.8 | 11.0 |
| | Positive electrode active material | | | | | NCM | NCM | NCM | NCM | NCM | NCM |
| | Binder | Type | | | | PVdF | PVdF | PVdF | PVdF | PVdF | PVdF |
| | | HSPb [MPa$^{1/2}$] | $\delta d3$ | | | 19.4 | 19.4 | 19.4 | 19.4 | 19.4 | 19.4 |
| | | | $\delta p3$ | | | 15.9 | 15.9 | 15.9 | 15.9 | 15.9 | 15.9 |
| | | | $\delta h3$ | | | 11.3 | 11.3 | 11.3 | 11.3 | 11.3 | 11.3 |
| HSP distance (Rb) [MPa$^{1/2}$] | | | | | | 5.4 | 13.2 | 13.2 | 8.7 | 8.7 | 13.2 |
| Dispersion state | | | | | | B | B | D | D | D | D |
| Viscosity stability | | | | | | C | A | B | C | C | B |
| Reduction of internal resistance | | | | | | C | B | D | D | D | D |
| High-temperature storage characteristics | | | | | | C | B | D | D | D | D |

It can be seen from Tables 3 and 4 that in Examples 1 to 8 in which a positive electrode was produced using a conductive material dispersion liquid that contained a carbon material, a dispersant, and a dispersion medium and in which the HSP distance ($R_d$) of Hansen solubility parameters (HSP$_c$) of the carbon material and Hansen solubility parameters (HSP$_d$) of the dispersant was not more than a specific value, it was possible to produce a secondary battery having reduced internal resistance and good high-temperature storage characteristics. It can also be seen that the conductive material dispersion liquids of Examples 1 to 8 had a good dispersion state and excellent viscosity stability.

In contrast, it can be seen from Table 4 that the internal resistance of a secondary battery did not sufficiently decrease and high-temperature storage characteristics deteriorated in Comparative Examples 1 to 4 in which a positive electrode was produced using a conductive material dispersion liquid in which the HSP distance ($R_d$) exceeded the specific value. It can also be seen that the dispersion state of the conductive material dispersion liquid deteriorated in Comparative Examples 1 to 4.

INDUSTRIAL APPLICABILITY

According to the present disclosure, it is possible to provide a conductive material dispersion liquid, a slurry for a secondary battery positive electrode, and a positive electrode for a secondary battery that can reduce internal resistance of a secondary battery while also ensuring good high-temperature storage characteristics of the secondary battery.

Moreover, according to the present disclosure, it is possible to provide a secondary battery having reduced internal resistance and excellent high-temperature storage characteristics.

The invention claimed is:

1. A conductive material dispersion liquid comprising a carbon material, a dispersant, and a dispersion medium, wherein
   an HSP distance ($R_d$) of Hansen solubility parameters (HSP$_c$) of the carbon material and Hansen solubility parameters (HSP$_d$) of the dispersant is 10.0 MPa$^{1/2}$ or less, and
   the dispersant includes a hydrogenated 1,3-butadiene unit, and 1,2-bonded hydrogenated butadiene units are 4.0 mass % or more and 15 mass % or less when all hydrogenated 1,3-butadiene units in the dispersant are taken to be 100 mass %.

2. The conductive material dispersion liquid according to claim 1, wherein a hydrogen bonding term $\delta_{h1}$ among the Hansen solubility parameters (HSP$_c$) of the carbon material is 12.0 MPa$^{1/2}$ or less.

3. The conductive material dispersion liquid according to claim 1, wherein the carbon material includes a fibrous carbon material.

4. A slurry for a secondary battery positive electrode comprising: the conductive material dispersion liquid according to claim 1; and a positive electrode active material.

5. The slurry for a secondary battery positive electrode according to claim 4, further comprising a binder.

6. The slurry for a secondary battery positive electrode according to claim 5, wherein an HSP distance ($R_b$) of the Hansen solubility parameters ($HSP_c$) of the carbon material and Hansen solubility parameters ($HSP_b$) of the binder is larger than the HSP distance ($R_d$).

7. A positive electrode for a secondary battery comprising a positive electrode mixed material layer formed using the slurry for a secondary battery positive electrode according to claim 4.

8. A secondary battery comprising the positive electrode for a secondary battery according to claim 7.

* * * * *